United States Patent
Murakami et al.

(10) Patent No.: US 9,260,032 B2
(45) Date of Patent: Feb. 16, 2016

(54) BATTERY CHARGE/DISCHARGE CONTROL DEVICE, BATTERY CHARGE/DISCHARGE CONTROL METHOD, AND HYBRID WORKING MACHINE WITH BATTERY CHARGE/DISCHARGE CONTROL DEVICE

(71) Applicant: Komatsu Ltd., Tokyo (JP)

(72) Inventors: Kentaro Murakami, Chigasaki (JP); Tadashi Kawaguchi, Hiratsuka (JP); Makoto Hashimoto, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/674,101

(22) Filed: Mar. 31, 2015

(65) Prior Publication Data

US 2015/0202979 A1  Jul. 23, 2015

Related U.S. Application Data

(62) Division of application No. 13/994,386, filed as application No. PCT/JP2012/073545 on Sep. 13, 2012, now Pat. No. 9,045,044.

(30) Foreign Application Priority Data

Feb. 15, 2012 (JP) ................................. 2012-030483

(51) Int. Cl.
*B60L 11/00* (2006.01)
*B60L 11/18* (2006.01)
*B60W 10/06* (2006.01)
*B60W 10/26* (2006.01)
*B60W 20/00* (2006.01)
(Continued)

(52) U.S. Cl.
CPC ............. *B60L 11/1851* (2013.01); *B60L 1/003* (2013.01); *B60L 3/0046* (2013.01); *B60L 11/005* (2013.01);
(Continued)

(58) Field of Classification Search
CPC ....... B60L 11/18; B60L 11/1851; B60L 7/06; B60L 7/14; B60L 11/123; B61C 3/00; H02P 3/14; H01M 2/02; H01M 12/06; H01M 6/5011; H01M 8/184; B60K 6/04; B60K 6/00; B60K 6/445; B60K 6/485; B60W 10/06
See application file for complete search history.

(56) References Cited

U.S. PATENT DOCUMENTS 6,204,636 B1 * 3/2001 Kinoshita ............. B60K 6/485
320/134
6,239,508 B1 * 5/2001 Faris ................... H01M 6/5011
307/10.1

(Continued)

FOREIGN PATENT DOCUMENTS

CN    1477302 A    2/2004
CN  101622767 A    1/2010
(Continued)

OTHER PUBLICATIONS

International Search Report dated Oct. 23, 2012, issued for PCT/JP2012/073545.

*Primary Examiner* — Behrang Badii
(74) *Attorney, Agent, or Firm* — Locke Lord LLP

(57) ABSTRACT

A battery charge/discharge control device which performs battery charge/discharge control in a working machine with a battery capable of storing electric energy generated by a generator motor coupled to an engine and driving the generator motor or at least one of other electric actuators by the stored electric energy and a controller which controls a distribution of the electric energy among the battery, the generator motor, and the electric actuator, wherein the controller performs the charge/discharge control in which the electric energy of the battery is discharged when the engine is driven and recharging to the battery is permitted on a condition that a state in which an engine speed is equal to or lower than a predetermined engine speed is maintained for a predetermined time after the battery is completely discharged.

6 Claims, 8 Drawing Sheets

(51) Int. Cl.

| | | |
|---|---|---|
| *E02F 9/20* | (2006.01) | |
| *B60L 11/02* | (2006.01) | |
| *B60L 1/00* | (2006.01) | |
| *B60L 3/00* | (2006.01) | |
| *B60L 11/12* | (2006.01) | |
| *B60L 11/14* | (2006.01) | |
| *B60L 15/20* | (2006.01) | |
| *H01M 10/44* | (2006.01) | |
| *B60K 6/445* | (2007.10) | |
| *B60W 10/08* | (2006.01) | |

(52) U.S. Cl.
CPC ............... *B60L 11/02* (2013.01); *B60L 11/123* (2013.01); *B60L 11/14* (2013.01); *B60L 11/1809* (2013.01); *B60L 11/1861* (2013.01); *B60L 15/20* (2013.01); *B60W 10/06* (2013.01); *B60W 10/26* (2013.01); *B60W 20/00* (2013.01); *B60W 20/106* (2013.01); *E02F 9/2091* (2013.01); *B60K 6/445* (2013.01); *B60L 2200/40* (2013.01); *B60L 2210/14* (2013.01); *B60L 2210/40* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/547* (2013.01); *B60L 2240/549* (2013.01); *B60L 2250/24* (2013.01); *B60W 10/08* (2013.01); *B60Y 2400/114* (2013.01); *H01M 10/44* (2013.01); *H01M 2220/20* (2013.01); *Y02T 10/6286* (2013.01); *Y02T 10/7077* (2013.01); *Y10S 903/903* (2013.01)

(56) References Cited

U.S. PATENT DOCUMENTS

| | | | |
|---|---|---|---|
| 6,352,489 | B1 | 3/2002 | Kuroda et al. |
| 6,434,453 | B1 * | 8/2002 | Kuroda ................. B60K 6/485 123/325 |
| 6,565,473 | B2 | 5/2003 | Endo et al. |
| 6,621,175 | B1 * | 9/2003 | Kuroda ................... B60K 6/48 290/40 D |
| 6,686,724 | B2 * | 2/2004 | Coates ................... B60K 6/445 320/135 |
| 6,875,154 | B2 | 4/2005 | Mitsutani et al. |
| 6,885,113 | B2 | 4/2005 | Lim |
| 7,430,967 | B2 * | 10/2008 | Kumar ...................... B60L 7/06 105/35 |
| 8,421,418 | B2 | 4/2013 | Kumashiro et al. |
| 2001/0024104 | A1 | 9/2001 | Suzuki |
| 2002/0094910 | A1 | 7/2002 | Endo et al. |
| 2003/0218447 | A1 * | 11/2003 | Coates ................... B60K 6/445 320/134 |
| 2004/0046394 | A1 | 3/2004 | Lim |
| 2004/0084002 | A1 * | 5/2004 | Mitsutani .............. F02D 41/021 123/179.4 |
| 2006/0012320 | A1 * | 1/2006 | Kumar ...................... B60L 7/06 318/376 |
| 2006/0172843 | A1 | 8/2006 | Nada |
| 2010/0090628 | A1 | 4/2010 | Endo et al. |
| 2010/0270976 | A1 | 10/2010 | Tamura |
| 2011/0093150 | A1 | 4/2011 | Yanagisawa et al. |
| 2011/0213524 | A1 | 9/2011 | Matsumoto |
| 2012/0130576 | A1 | 5/2012 | Sugiyama et al. |
| 2013/0057305 | A1 | 3/2013 | Jimbo |

FOREIGN PATENT DOCUMENTS

| | | |
|---|---|---|
| JP | 2000-270408 A | 9/2000 |
| JP | 2008-030559 A | 2/2008 |
| JP | 2010-080191 A | 4/2010 |
| JP | 2010-202135 A | 9/2010 |
| JP | 2011-242344 A | 12/2011 |
| WO | WO-2008/111649 A1 | 9/2008 |
| WO | WO-2009/125833 A1 | 10/2009 |

\* cited by examiner

BATTERY CHARGE/DISCHARGE CONTROL DEVICE, BATTERY CHARGE/DISCHARGE CONTROL METHOD, AND HYBRID WORKING MACHINE WITH BATTERY CHARGE/DISCHARGE CONTROL DEVICE

This application is a divisional application of U.S. application Ser. No. 13/994,386 filed Jun. 14, 2013 which claims the right of priority under 35 U.S.C. §119 based on Japanese Patent Application No. 2012-030483 filed Feb. 15, 2012.

FIELD

The present invention relates to a battery charge/discharge control device, a battery charge/discharge control method, and a hybrid working machine with a battery charge/discharge control device, where the hybrid working machine may store electric energy (the electric energy is referred to as a charge in the description below) generated by a generator motor mechanically coupled to an engine in a battery and may drive the generator motor by the electric energy stored in the battery so as to drive the engine by assisting the output thereof or may drive the other electric actuator by the electric energy stored in the battery, and the hybrid working machine includes a controller which controls a distribution of the electric energy between the battery and the generator motor or between the battery and the other electric actuator, thereby performing the battery charge/discharge control.

BACKGROUND

Recently, a hybrid working machine has been practically used in which an engine and a generator motor mechanically coupled to the engine are provided as a driving source and an electric actuator is rotationally driven by the electric energy generated by the generator motor. In such a hybrid working machine, the electric energy stored in a battery to be described later or the electric energy generated by the generator motor is used when accelerating (performing a power running action of) the electric actuator, and a power generation action of the electric actuator is performed and the generated electric energy is stored in the battery when decelerating (performing a regeneration action of) the electric actuator. As the battery, a nickel hydride battery as a so-called secondary battery, a lithium ion battery, a capacitor, or the like is used. For example, the capacitor may charge and discharge the electric energy in a short time, and has a characteristic in which a large amount of electric energy (charge) may be charged and discharged. Thus, the capacitor is mounted on the hybrid construction machine.

When performing maintenance such as a replacement of the capacitor or the capacitor peripheral unit or an inspection of a deterioration state of the capacitor, there is a need to perform charge extracting (discharging) of the capacitor. When discharging not only the capacitor but also the secondary battery, the capacitor may be taken out from the hybrid working machine and the charge extracting may be performed by using a tool such as a discharger. However, when the process of extracting the charge of the capacitor mounted on the hybrid working machine may be performed by a structure in which the electric energy is consumed (discharged) by using the engine as a load while the capacitor is provided inside the hybrid working machine or a control device (a charge/discharge device) is provided in the hybrid working machine and the charge extracting is performed by using the charge/discharge device, there is no need to perform a troublesome work in which the discharger is carried to the site where the hybrid working machine is operated. That is, the hybrid working machine is provided with the charge/discharge device and power is supplied (discharged) from the capacitor to the generator motor rotationally driven with the driving of the engine so as to drive the generator motor by using the operating engine as a load, thereby performing the discharging (the charge extracting) of the charge stored in the capacitor.

Furthermore, Patent Literature 1 discloses a configuration in which an engine as a load is driven and a current and a voltage of a generator motor and a booster are controlled so as to promptly extract a charge of a capacitor. Further, Patent Literature 2 discloses a configuration in which any one of discharging control of driving an engine starting motor by a running battery using an engine as a load and charging control of rotationally driving the engine starting motor by the engine to charge the running battery is performed and the IV characteristics of the battery are calculated based on the battery current and voltage at that time so as to inspect the battery deterioration state.

CITATION LIST

Patent Literature

Patent Literature 1: WO 2008/111649 A
Patent Literature 2: JP 2000-270408 A

SUMMARY

Technical Problem

Incidentally, when extracting the charge of the capacitor described above by using the engine as the load, the operator (an operator or a service man) stops the engine by operating a key switch, serving as an instruction output unit used to start or stop the engine, to an off position so as to stop the operation of the hybrid working machine later. As the key switch, a switch which may start or stop the engine by inserting a key into a key cylinder and rotating the key or a switch which may start or stop the engine by an operation of a button is used. In a case where the key switch is of a type in which the key is rotated while being inserted into the key cylinder as described above, an off position, an on position, and a start position are set in the rotation direction. Here, the engine is stopped when the key is operated to the off position, a current is supplied to each electric system when the key is operated to the on position, and a starter (an engine starting motor) for starting the engine is rotationally driven so as to start the engine when the key is further rotated from the on position to the start position.

However, the operator who performs the maintenance of the capacitor or the peripheral unit thereof recognizes the completion of the charge extracting as described above and operates the key switch to the off position (rotates the key to the off position). Accordingly, the operator determines that the engine is stopped and operates a monitor device provided in an operation room of the hybrid working machine and displaying a machine status such as a total operation time of the hybrid working machine or a fuel remaining amount after the determination so as to check the machine status. That is, the operator may operate the key switch to the on position (rotate the key to the on position) so as to supply power to the monitor device in the checking operation. At this time, when the key is not operated (rotated) to the start position while the key switch is operated to the on position, the starter (the engine starting motor) is not rotationally driven and the engine is not started. However, a current is supplied to a fuel injection system of the engine, so that a fuel is supplied into the combustion chamber of the engine.

Accordingly, as the key switch is operated to the off position, the supply of the fuel from the fuel injection device to the engine is stopped and the engine speed decreases. However, since the key switch is operated to the on position (the operation in which the key is not operated to the start position and the starter is not rotationally driven) while the engine speed decrease, the fuel is supplied from the fuel injection device to the engine. Then, when the engine is driven at a certain engine speed at the time point, a phenomenon occurs in which the fuel explodes in the combustion chamber of the engine, so that the engine speed increases. Here, the controller which controls the distribution of the electric energy between the capacitor and the generator motor or between the capacitor and the other electric actuator recharges the capacitor as a condition in which the key switch is present at the on position and the engine speed transmitted from the rotation sensor for detecting the engine speed exceeds the predetermined engine speed.

That is, the predetermined engine speed indicates an engine speed which becomes a bifurcation used to determine whether the engine speed increases by the fuel supplied to the engine only by the operation in which the key switch is operated to the on position after the key switch is operated to the off position. Even when the key switch is operated to the on position and the fuel is supplied to the engine while the engine speed is lower than the predetermined engine speed, the engine speed does not increase due to the friction resistance (the rotation resistance) of the crank shaft of the engine or the rotor shaft of the generator motor. That is, when the key switch is operated to the on position while the engine speed exceeds the predetermined engine speed after the key switch is operated to the off position, the engine speed increases, and the generator motor mechanically coupled to the engine is rotationally driven to generate power, thereby causing a phenomenon in which the capacitor is recharged.

That is, even in the capacitor charge extracting completion (discharging completion) state, when the engine speed is the predetermined engine speed or more immediately after the charge extracting completion, there is a case in which the capacitor is unexpectedly charged (recharged) by the operator, and hence there is a problem in which the maintenance of the capacitor is disturbed. That is, when the capacitor subjected to the charge extracting is recharged while being provided in the vehicle, a problem arises when taking the capacitor out from the hybrid working machine to replace or check the capacitor or when performing the maintenance on the removed capacitor. When performing the inspection of measuring the charge amount of the capacitor so as to check the deterioration state of the capacitor, the discharging (charge extracting) process needs to be essentially performed again if the charge remains in the capacitor. Further, when discarding the capacitor taken out from the hybrid working machine, the discharging (charge extracting) process needs to be essentially performed before the conveying operation or the disassembling operation for discarding as in the general secondary battery if the charge remains in the capacitor.

The invention is made in view of such circumstances, and it is an object of the invention to provide a battery charge/discharge control device, a battery charge/discharge control method, and a hybrid working machine with a battery charge/discharge control device capable of reliably preventing a battery from being unexpectedly charged by an operator after extracting a charge of the battery.

Solution to Problem

According to the present invention, a battery charge/discharge control device which performs battery charge/discharge control in a working machine with a battery capable of storing electric energy generated by a generator motor coupled to an engine and driving the generator motor or at least one of other electric actuators by the stored electric energy and a controller which controls a distribution of the electric energy among the battery, the generator motor, and the electric actuator, wherein the controller performs the charge/discharge control in which the electric energy of the battery is discharged when the engine is driven and recharging to the battery is permitted on a condition that a state in which an engine speed is equal to or lower than a predetermined engine speed is maintained for a predetermined time after the battery is completely discharged.

In the present invention, the controller performs the charge/discharge control in which the recharging to the battery is prohibited until the state in which the engine speed is equal to or lower than the predetermined engine speed is maintained for the predetermined time after the battery is completely discharged.

In the present invention, the state in which the engine speed is equal to or lower than the predetermined engine speed is a state after an engine stopping instruction is generated by an instruction output unit which instructs starting and stopping of the engine.

In the present invention, the predetermined engine speed is an engine speed in which the engine speed increases when an instruction output unit which instructs starting and stopping of the engine is operated so that a fuel injection device supplying a fuel to the engine supplies a fuel to the engine after the engine is stopped by the instruction output unit.

According to the present invention, a battery charge/discharge control device which performs battery charge/discharge control in a working machine with a battery capable of storing electric energy generated by a generator motor coupled to an engine and driving the generator motor or at least one of other electric actuators by the stored electric energy and a controller which controls a distribution of the electric energy among the battery, the generator motor, and the electric actuator, wherein the controller performs the charge/discharge control in which the electric energy of the battery is discharged when the engine is driven and recharging to the battery is permitted on a condition that a cancelation signal for canceling prohibition of recharging to the battery is received after the battery is completely discharged.

In the present invention, the controller performs the control in which the recharging to the battery is prohibited until the cancelation signal for cancelling the prohibition of the recharging to the battery is received after the battery is completely discharged.

In the present invention, the cancelation signal is a signal which is generated by an operation of an operation unit.

In the present invention, the charge/discharge control is performed by determining the battery discharging completion as a time point in which a predetermined time is elapsed from a state where a voltage of the battery is equal to or lower than a predetermined value.

According to the present invention, a battery charge/discharge control method which performs battery charge/discharge control in a working machine with a battery capable of storing electric energy generated by a generator motor coupled to an engine and driving the generator motor or at least one of other electric actuators by the stored electric energy and a controller which controls a distribution of the electric energy among the battery, the generator motor, and the electric actuator, wherein the controller performs the charge/discharge control in which the electric energy of the battery is discharged when the engine is driven and recharging to the battery is permitted on a condition that a state in which an engine speed is equal to or lower than a predetermined engine speed is maintained for a predetermined time after the battery is completely discharged.

According to the present invention, a battery charge/discharge control method which performs battery charge/discharge control in a working machine with a battery capable of storing electric energy generated by a generator motor coupled to an engine and driving the generator motor or at least one of other electric actuators by the stored electric energy and a controller which controls a distribution of the electric energy among the battery, the generator motor, and the electric actuator, wherein the controller performs the charge/discharge control in which the electric energy of the battery is discharged when the engine is driven and recharging to the battery is permitted on a condition that a cancelation signal for canceling prohibition of recharging to the battery is received after the battery is completely discharged.

According to the present invention, a hybrid working machine comprises: the battery charge/discharge control device.

According to the invention, the control is performed such that the engine is stopped after performing the charge extracting process on the battery while the battery is mounted on the hybrid working machine and the recharging to the battery is permitted as a condition in which any starting instruction is transmitted to the engine and the engine is maintained at the predetermined engine speed or less for the predetermined time or the recharging to the battery is permitted as a condition in which the cancelation signal for cancelling the prohibition of the recharging to the battery is received after the charge of the battery is completely extracted. Accordingly, it is possible to reliably prevent the battery from being unexpectedly charged by the operator after extracting the charge of the battery.

DESCRIPTION OF EMBODIMENTS

Hereinafter, an embodiment of the invention will be described by referring to the accompanying drawings.

First Embodiment

Figure 1:
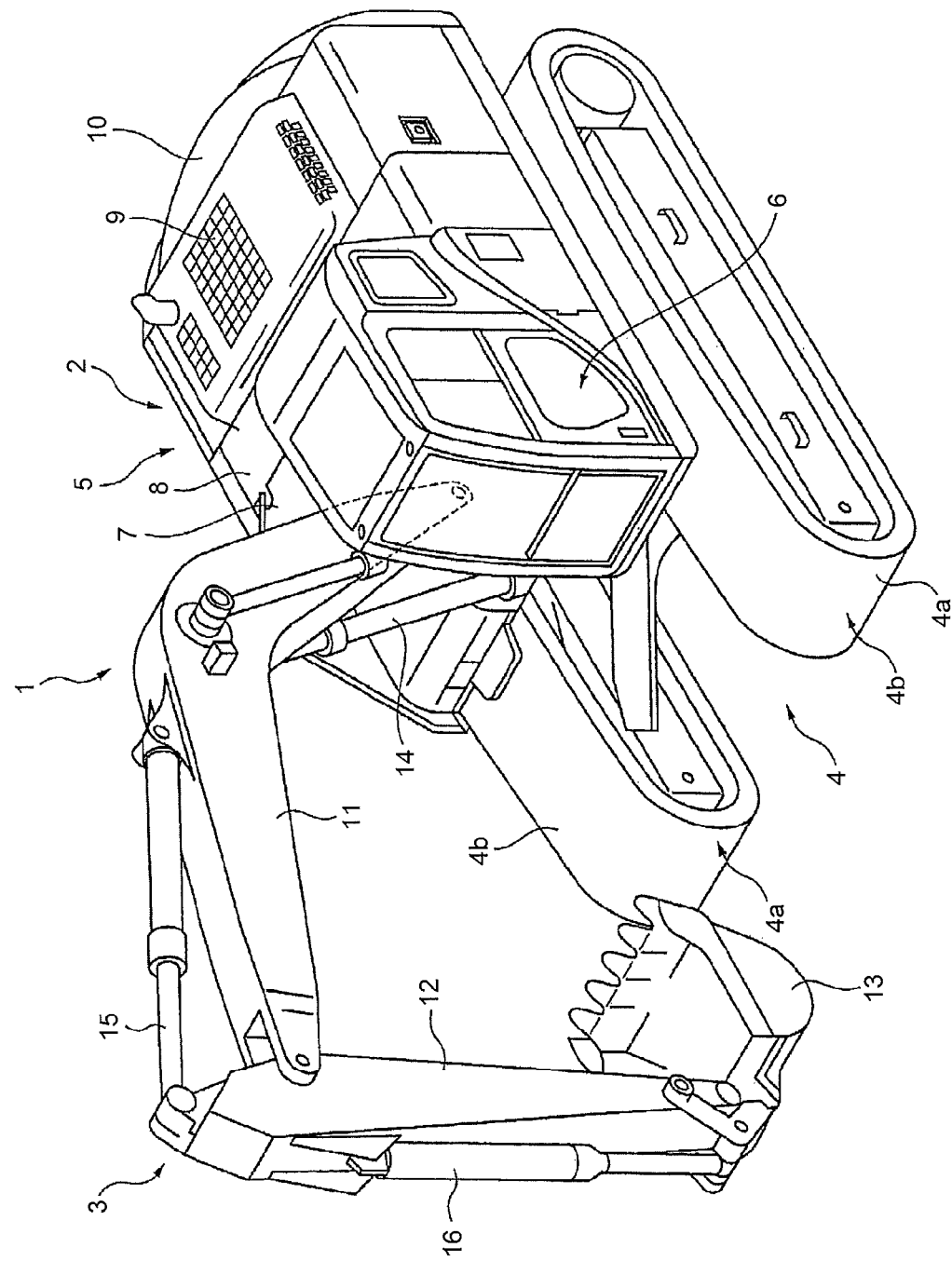
FIG. 1 is a diagram illustrating an entire configuration of a hybrid excavator which is an example as a working machine.
Figure 2:
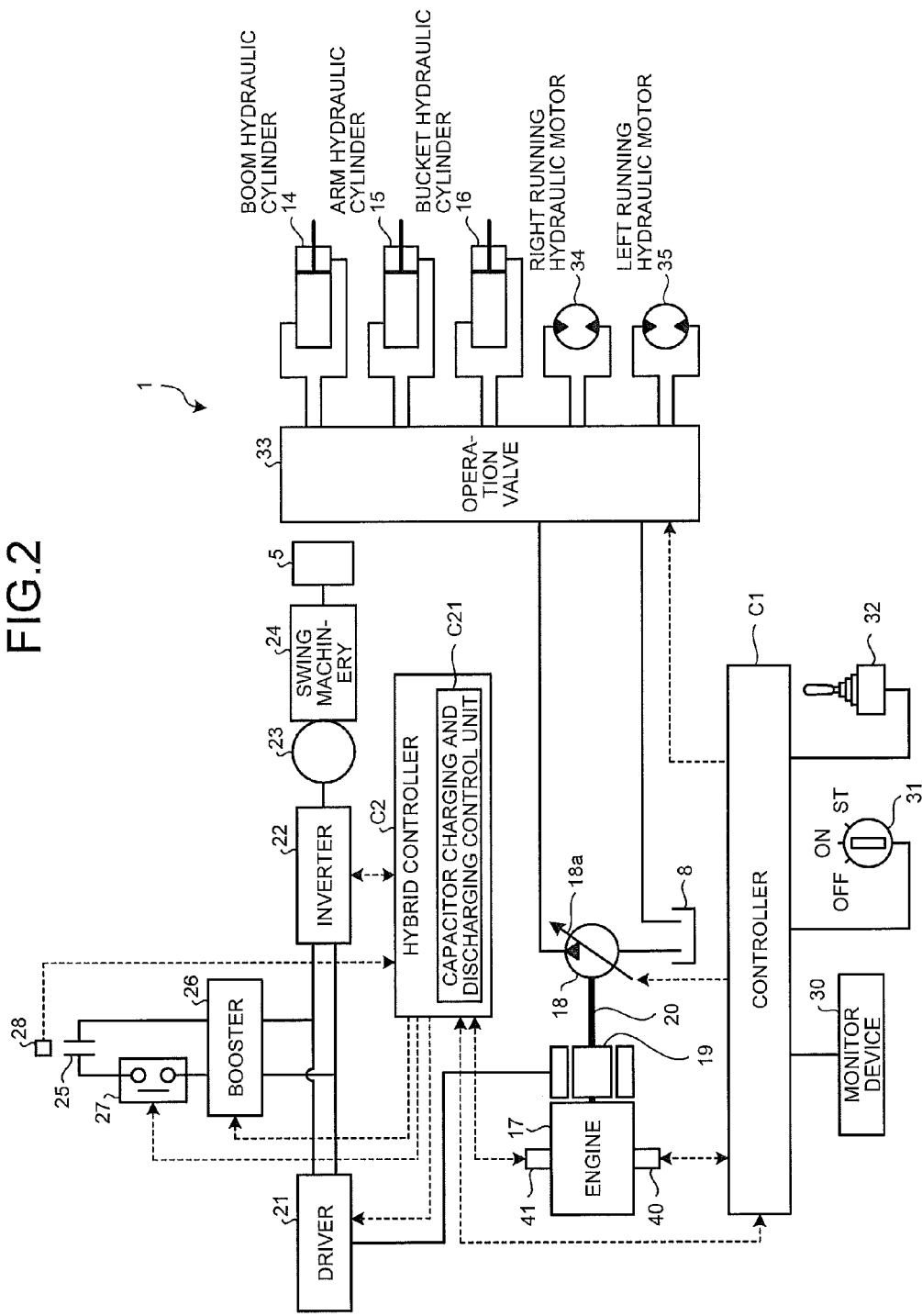
FIG. 2 is a schematic diagram including main components of the hybrid excavator and an electric circuit and a hydraulic circuit illustrating a relation between the main components.

First, FIGS. 1 and 2 illustrate an entire configuration of a hybrid excavator 1 which is an example as a hybrid working machine. Furthermore, a concept of a simple working machine instead of a hybrid type includes a construction machine such as an excavator, a bulldozer, a dump truck, and a wheel loader, and the construction machine with a peculiar hybrid characteristic configuration is set as a hybrid working machine. The hybrid excavator 1 includes a vehicle body 2 and a working unit 3. The vehicle body 2 includes a lower running body 4 and an upper swing body 5. The lower running body 4 includes a pair of running devices 4a. Each running device 4a includes a crawler track 4b. Each running device 4a drives the crawler track 4b by the rotational driving of a right running hydraulic motor 34 and a left running hydraulic motor 35 illustrated in FIG. 2 so that the hybrid excavator 1 runs.

The upper swing body 5 is provided in the upper portion of the lower running body 4 so as to be swingable, a swing motor 23 is connected to a driving shaft of a swing machinery 24 (decelerator), a rotational force of the swing motor 23 is transmitted through the swing machinery 24, and the transmitted rotational force is transmitted to the upper swing body 5 through a swing pinion and a swing circle (not illustrated) so as to swing the upper swing body 5. Further, the upper swing body 5 is provided with an operation room 6. The upper swing body 5 includes a fuel tank 7, a hydraulic oil tank 8, an engine room 9, and a counter weight 10. The fuel tank 7 stores fuel for driving an engine 17. The hydraulic oil tank 8 stores hydraulic oil discharged from a hydraulic pump 18 with respect to hydraulic units which are a hydraulic cylinder such as a boom hydraulic cylinder 14, an arm hydraulic cylinder 15, and a bucket hydraulic cylinder 16 and a hydraulic motor (a hydraulic actuator) such as the right running hydraulic motor 34 and the left running hydraulic motor 35. The engine room 9 accommodates various units such as the engine 17, the hydraulic pump 18, a generator motor 19, and a capacitor 25. The counter weight 10 is disposed behind the engine room 9.

The working unit 3 is attached to the center position of the front portion of the upper swing body 5, and includes a boom 11, an arm 12, a bucket 13, the boom hydraulic cylinder 14, the arm hydraulic cylinder 15, and the bucket hydraulic cylinder 16. The base end of the boom 11 is connected to the upper swing body 5 so as to be swingable. Further, the front end which is opposite to the base end of the boom 11 is connected to the base end of the arm 12 so as to be rotatable. The bucket 13 is connected to the front end which is opposite to the base end of the arm 12 so as to be rotatable. Further, the bucket 13 is connected to the bucket hydraulic cylinder 16 through a link. The boom hydraulic cylinder 14, the arm hydraulic cylinder 15, and the bucket hydraulic cylinder 16 are hydraulic cylinders (hydraulic actuators) which are operated in a telescopic manner by the hydraulic oil discharged from the hydraulic pump 18. The boom hydraulic cylinder 14 swings the boom 11. The arm hydraulic, cylinder 15 swings the arm 12. The bucket hydraulic cylinder 16 swings the bucket 13.

In FIG. 2, the hybrid excavator 1 includes the engine 17, the hydraulic pump 18, and the generator motor 19 as driving sources. A diesel engine is used as the engine 17, and a variable displacement hydraulic pump is used as the hydraulic pump 18. For example, a swash plate type hydraulic pump which changes the pump capacity by changing the tilting angle of the swash plate 18a is used. The engine 17 is provided with a rotation sensor 41 which detects an engine speed, and a signal which represents the engine speed detected by the rotation sensor 41 is input to a hybrid controller C2. The rotation sensor 41 is operated by receiving power from a battery (not illustrated), and detects the engine speed of the engine 17 as long as a key switch 31 to be described later is operated to an on (ON) or start (ST) position. The hydraulic pump 18 and the generator motor 19 are mechanically coupled to a driving shaft 20 of the engine 17, and when the engine 17 is driven, the hydraulic pump 18 and the generator motor 19 are driven. As a hydraulic driving system, the hydraulic driving system includes an operation valve 33, the boom hydraulic cylinder 14, the arm hydraulic cylinder 15, the bucket hydraulic cylinder 16, the right running hydraulic motor 34, and the left running hydraulic motor 35, and such hydraulic units are driven by using the hydraulic pump 18 as a hydraulic oil supply source to the hydraulic driving system. Furthermore, the operation valve 33 is a flow direction control valve, where a spool (not illustrated) is moved in response to the operation direction of each operation lever 32 so as to regulate the hydraulic oil flow direction to each hydraulic actuator and to supply the hydraulic oil in response to the operation amount of the operation lever 32 to the hydraulic actuator such as the boom hydraulic cylinder 14, the arm hydraulic cylinder 15, the bucket hydraulic cylinder 16, the right running hydraulic motor 34, or the left running hydraulic motor 35.

An electric driving system includes a driver 21 which is connected to the generator motor 19 through a power cable, an inverter 22 which is connected to the driver 21 through a wiring harness, a booster 26 which is provided between the driver 21 and the inverter 22 through a wiring harness, a capacitor 25 which is connected to the booster 26 through a contactor 27 (an electromagnetic contactor), a swing motor 23 which is connected to the inverter 22 through a power cable, and the like. Furthermore, the contactor 27 generally closes the electric circuit between the capacitor 25 and the booster 26 so as to become a power distribution state. Meanwhile, when the hybrid controller C2 determines that the electric circuit needs to be opened due to detection of the leakage of electricity or the like, the hybrid controller C2 outputs an instruction signal for changing the power distribution state to the contactor 27 to the interruption state. Then, the contactor 27 which receives the instruction signal from the hybrid controller C2 opens the electric circuit.

The swing motor 23 is mechanically connected to the swing machinery 24 as described above. The electric energy which is generated by the generator motor 19 or the electric energy which is stored in the capacitor 25 becomes a power source of the swing motor 23, and swings the upper swing body 5 through the swing machinery 24. That is, the swing motor 23 swings and accelerates the upper swing body 5 by performing a power running action using the electric energy supplied from the generator motor 19 or the capacitor 25. Then, when the upper swing body 5 swings in an deceleration state, the swing motor 23 performs a regeneration action, and the electric energy which is generated by the regeneration action is supplied (charged) to the capacitor 25.

Further, the generator motor 19 supplies (charges) the generated electric energy to the capacitor 25, and supplies the electric energy to the swing motor 23 depending on the status. As the generator motor 19, for example, a SR (switched reluctance) motor is used. Furthermore, even when a synchronous electric motor using a permanent magnet is used instead of the SR motor, it is possible to supply the electric energy to the capacitor 25 or the swing motor 23. However, in a case where the SR motor is used, the SR motor is advantageous from the viewpoint of the cost since the motor does not use a magnet including expensive rare metal. The generator motor 19 is mechanically coupled to the driving shaft 20 of the engine 17. Accordingly, the rotor shaft of the generator motor 19 is rotated by the driving of the engine 17.

The booster 26 raises the voltage of the electric energy (the charge stored in the capacitor 25) supplied to the generator motor 19 or the swing motor 23 through the driver 21 and the inverter 22. The raised voltage is applied to the generator motor 19 when assisting the power of the swing motor 23 or the engine 17. Furthermore, the booster 26 is also used to drop the voltage when charging the electric energy generated by the generator motor 19 or the swing motor 23 to the capacitor 25.

Furthermore, the respective torques of the generator motor 19 and the swing motor 23 are controlled by the driver 21 and the inverter 22 under the control by the hybrid controller C2. In the amount (the charge amount or the capacitance) of the electric energy stored in the capacitor 25, the magnitude of the voltage may be managed as an index. In order to detect the magnitude of the voltage, a predetermined output terminal of the capacitor 25 is provided with a voltage sensor 28. The voltage which is detected by the voltage sensor 28 is transmitted as an electric signal to the hybrid controller C2. Then, the hybrid controller C2 monitors the charged amount (the amount of the electric energy (the charge amount or the capacitance)) of the capacitor 25, and performs a management in which the electric energy generated by the generator motor 19 is supplied (charged) to the capacitor 25 or is supplied to the swing motor 23 (where the power is supplied for the power running action).

Further, for example, an electric double layer capacitor is used as the capacitor 25. Instead of the capacitor 25, a battery which serves as another secondary battery such as a lithium-ion battery or a nickel hydride battery may be used. Further, as the swing motor 23, for example, a permanent magnet type synchronous electric motor is used.

The hydraulic driving system and the electric driving system are driven in response to the operation of the operation levers 32 such as a working unit lever, a running lever, and a swing lever which are installed inside the operation room 6 provided inside the vehicle body 2. In a case where the operator of the hybrid excavator 1 operates the operation lever 32 (the swing lever) serving as an operation unit for swinging the upper swing body 5, the operation direction and the operation amount of the swing lever are detected by a potentiometer or a pilot pressure sensor, and the detected operation amount is transmitted as an electric signal to the controller C1 and the hybrid controller C2. Even when the other operation lever 32 is operated, the electric signal is transmitted to the respective controllers in this way. In response to the operation direction and the operation amount of the swing lever or the operation direction and the operation amount of the other operation lever 32, the controller C1 and the hybrid controller C2 control the inverter 22, the booster 26, or the driver 21 so as to perform the rotation operation (the power running action or the regeneration action) of the swing motor 23 or the power distribution control (the energy management) such as the management (the control for charging or discharging) of the electric energy of the capacitor 25 and the management (the assist for the generation or the engine output and the power running action to the swing motor 23) of the electric energy of the generator motor 19.

A monitor device 30 and a key switch 31 are installed inside the operation room 6 in addition to the operation lever 32. The monitor device 30 includes a liquid crystal panel, an operation button, and the like. Further, the monitor device 30 may be a touch panel obtained by integrating the display function of the liquid crystal panel with the function of the operation button for inputting various information items. The monitor device 30 is an information input and output device which has a function of informing the operator or the service man of information representing the operation state (the engine water temperature state, the failure state of the hydraulic unit, or the fuel remaining amount) of the hybrid excavator 1 and a function of performing the setting or the instruction (the setting of the output level of the engine, the setting of the speed level of the running speed, or the capacitor charge extracting instruction) desired by the operator with respect to the hybrid excavator 1.

The key switch 31 mainly includes a key cylinder as a constituting component. The key is inserted into the key cylinder and generates an instruction of driving the engine (the starting of the engine) in a manner such that the key is rotated so as to start the starter (the engine starting motor) provided in the engine 17 or generates an instruction of stopping the engine (the stopping of the engine) in a manner such that the key is rotated in the direction opposite to the case of starting the engine in the engine driving state. That is, the key switch 31 is an instruction output unit which outputs an instruction to various electric units of the engine 17 or the hybrid working machine 1. When the key is rotated (specifically, the key is operated to the off position to be described later) in order to stop the engine, the supply (feeding) of the electricity to various electric units from the battery (not illustrated) or the supply of fuel to the engine 17 is interrupted, so that the engine is stopped. As illustrated in FIG. 2, The key switch 31 interrupts the feeding of electricity to various electric units from the battery (not illustrated) when the key is rotated to the off (OFF) position, and feeds the electricity to various electric units from the battery (not illustrated) when the key is operated to the on (ON) position. Then, when the key is further rotated from that position to the start (ST) position, the starter (not illustrated) is started through the controller C1, thereby starting the engine. The key rotation position is present at the on (ON) position while the engine is driven after the engine 17 is started.

Furthermore, instead of the key switch 31 which mainly includes the key cylinder described above, another instruction output unit, for example, a press button type key switch may be employed. That is, the key switch may be configured so that the engine becomes an on (ON) state when a button is pressed once while the engine is stopped, the engine becomes an start (ST) state when the button is pressed further, and the engine becomes an off (OFF) state when the button is pressed while the engine is driven. Further, the key switch may be configured to start the engine as the condition in which the button is continuously pressed during a predetermined time while the engine is stopped so that the engine state is switched from the off (OFF) state to the start (ST) state.

The controller C1 includes a calculation device such as a CPU (a numerical calculation processor) or a memory (a storage device). The controller C1 controls the engine 17 and the hydraulic pump 18 based on the instruction signal output from the monitor device 30, the instruction signal output in response to the key position of the key switch 31, and the instruction signal (the signal representing the operation amount or the operation direction described above) output in response to the operation of the operation lever 32. The engine 17 is an engine in which electronic control may be performed by a common rail type fuel injection device 40. The engine may obtain a target engine output by appropriately controlling the fuel injection amount using the controller C1, and may set the engine speed and the output torque in response to the load state of the hybrid excavator 1.

The hybrid controller C2 controls the driver 21, the inverter 22, and the booster 26 as described above under the cooperation control with the controller C1, and controls the distribution of the electric energy of the generator motor 19, the swing motor 23, and the capacitor 25. The hybrid controller C2 includes a capacitor charge/discharge control unit C21. During the maintenance of the capacitor 25 or the peripheral unit thereof, the capacitor charge/discharge control unit C21 performs a control program for the capacitor charge/discharge control process to be described later.

Figure 3:
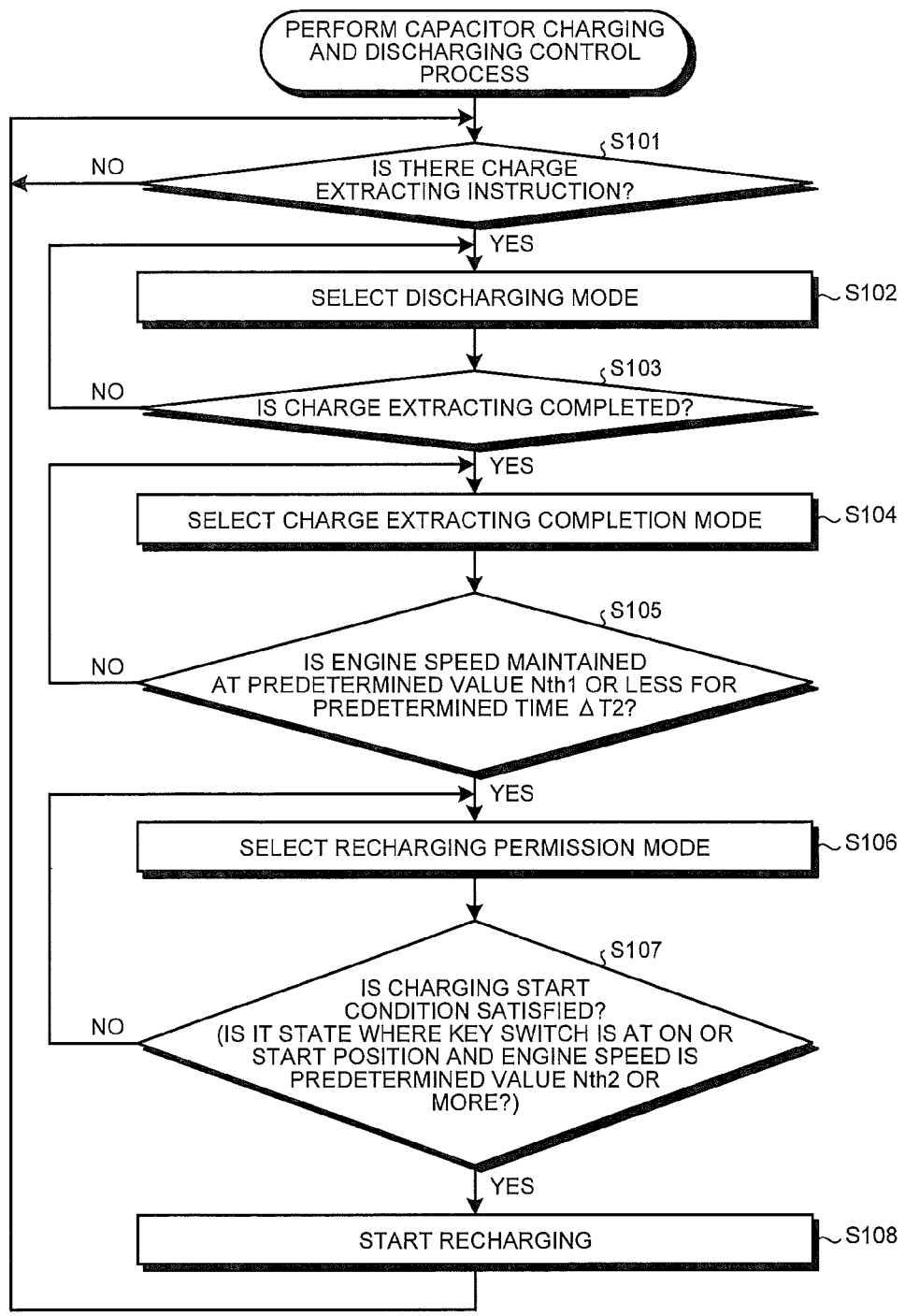
FIG. 3 is a flowchart illustrating a sequence of a capacitor charge/discharge control process which is performed by a capacitor charge/discharge control unit according to a first embodiment of the invention.

Here, a capacitor charge/discharge control process which is performed by the capacitor charge/discharge control unit C21 of the first embodiment will be described by referring to the flowchart illustrated in FIG. 3. The capacitor charge/discharge control process is started while the engine 17 is driven. As will be described later, the engine 17 is driven since the electric energy stored in the capacitor 25 is consumed (discharged) by using the engine 17 as a load. As illustrated in FIG. 3, the capacitor charge/discharge control unit C21 first determines whether there is a charge extracting instruction (step S101). The charge extracting instruction is an instruction signal which is generated by the operation of a predetermined operation button installed in the monitor device 30 from an operator or a service man (hereinafter, generally referred to as an operator), and the instruction signal is input to the capacitor charge/discharge control unit C21 through the controller C1. Specifically, the operator who performs the maintenance of the capacitor 25 or the peripheral unit thereof operates the operation button disposed on the monitor screen of the monitor device 30 or the operation button disposed in the monitor device 30 or the vicinity thereof while the engine 17 is driven, inputs a specific password or the like, and changes the monitor screen (a normal screen displaying the engine water temperature or the fuel remaining amount) to the maintenance screen. Subsequently, in order to select the capacitor charge extracting item from the maintenance screen, a portion indicating the capacitor charge extracting item displayed on the monitor screen is pressed by a finger in a case where the monitor device 30 is a touch panel or the operation button provided in the monitor device 30 or the operation button disposed near the monitor device 30 is operated in a case where the monitor device 30 is not a touch panel. Then, an instruction signal which instructs the charge extracting is generated, and the instruction signal is transmitted to the controller C1.

When there is the charge extracting instruction (Yes in step S101), the capacitor charge/discharge control unit C21 becomes a discharging mode (step S102), causes a current to flow from the capacitor 25 to the booster 26 while turning on the contactor 27, controls the booster 26 and the driver 21 so that the generator motor 19 is driven so as to consume (discharge) the electric energy stored in the capacitor 25 by the generator motor 19, and performs the charge extracting of the capacitor 25 by using the engine 17 as a load. Subsequently, the capacitor charge/discharge control unit C21 determines whether the charge extracting is completed (step S103). The determination in step S103 will be described. The capacitor voltage of the capacitor 25 is sequentially detected by the voltage sensor 28, a signal which represents the capacitor voltage detected by the voltage sensor 28 is received by the hybrid controller C2, and the capacitor charge/discharge control unit C21 determines that the charge extracting is completed when the capacitor voltage is lower than a predetermined value Vth for a predetermined time ΔT1.

Then, when the charge extracting is completed (Yes in step S103), the charge extracting completion (discharging completion) mode is selected (step S104). The charge extracting completion mode is a mode in which the recharging to the capacitor 25 is prohibited. That is, in the charge extracting completion mode, even when the key switch 31 is operated to the on position or the start position after the key switch 31 is first operated to the off position, the capacitor charge/discharge control unit C21 generates an interlock control signal (a recharging prohibition signal) of preventing the charging of the electric energy generated by the generator motor 19 to the capacitor 25, and outputs and maintains the recharging prohibition signal to the driver 21 or the inverter 22.

Figure 5:
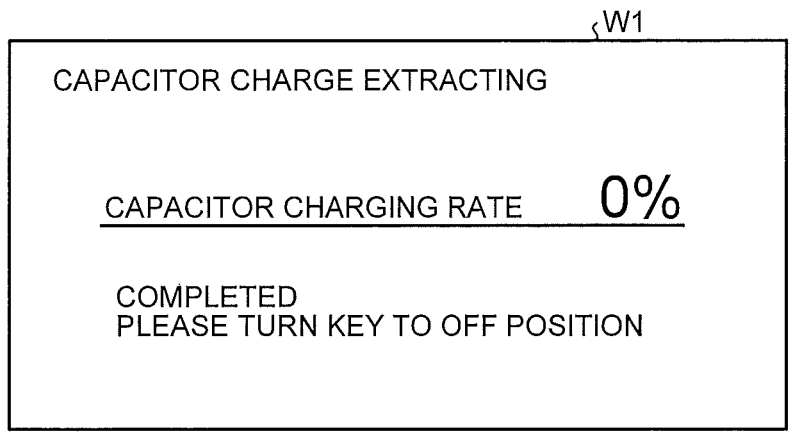
FIG. 5 is a diagram illustrating an example of a screen display of a monitor device according to the first embodiment of the invention.

Furthermore, when the charge extracting is completed, as illustrated in FIG. 5, a display representing the completion of the charge extracting and a display of changing the key switch 31 to the off (OFF) state are displayed on the monitor screen W1 of the monitor device 30. Then, when the key switch 31 is operated to the off position, the fuel injection device 40 stops the supply of the fuel to the engine 17, so that the engine speed decreases. Furthermore, as illustrated in FIG. 5, the capacitor charging rate is displayed as a numerical value on the monitor screen W1 based on the capacitor voltage which is detected by the voltage sensor 28. The capacitor charging rate is set as 100% in the full charged state and is set as 0% when the capacitor voltage is equal to or lower than a predetermined value Vth, where the amount of the electric energy stored in the capacitor 25 is indicated by the numerical value in percentage. With such a numerical display, the operator may recognize the charging state of the capacitor 25.

Subsequently, the capacitor charge/discharge control unit C21 determines whether the engine speed is maintained at a predetermined value Nth1 or less for a predetermined time ΔT2 (step S105). When the engine speed detected by the rotation sensor 41 is maintained at the predetermined value Nth1 or less for the predetermined time ΔT2 (Yes in step S105), the recharging permission mode is selected (step S106). The recharging permission mode is a mode in which the recharging to the capacitor 25 is permitted. Here, the relation between the predetermined value Nth1 and the operation states of the key switch 31 and the engine 17 will be described below. After the key switch 31 is operated to the off (OFF) position, the key switch 31 is operated to the on (ON) position while the engine 17 is driven so that the engine speed exceeds the predetermined value Nth1. However, in a state where the starter (not illustrated) is not started (that is, the key switch 31 is not rotated to the start (ST) position), the fuel injection device 40 supplies the fuel to the combustion chamber of the engine 17. The fuel injection device 40 supplies the fuel into the combustion chamber of the engine 17 with the operation of the key switch 31 to the on (ON) position. In this state, the engine 17 does not receive the instruction signal of the engine output (the target engine speed or the target torque) from the controller C1 since the engine is not continuously driven in general. However, the combustion of the fuel occurs in the combustion chamber by receiving the fuel while the engine 17 rotates at the engine speed equal to or higher than the predetermined value Nth1. As a result, the engine 17 does not receive the instruction signal from the controller C1, but a phenomenon occurs in which the engine speed independently increases. When the engine speed is lower than the predetermined value Nth1, the engine speed does not increase independently due to a load such as a rotation resistance of a crank shaft or a rotation resistance of a rotor shaft of the generator motor 19 even when the fuel is supplied to the engine 17.

Accordingly, the predetermined value Nth1 is different due to the type or the structure of the engine 17 or the generator motor 19, and is obtained based on the original characteristics of the engine 17 and the like. However, the predetermined value is the engine speed used as the bifurcation for determining whether the engine speed increases when the key switch 31 is operated to the on (ON) position after the engine is stopped as described above. Accordingly, when the engine speed is equal to or lower than the predetermined value Nth1, the engine speed of the engine 17 does not increase independently even when the key switch 31 is operated to the on (ON) position.

Subsequently, the capacitor charge/discharge control unit C21 determines whether the charging start condition is satisfied (step S107). The charging start condition is a condition in which the key switch 31 is operated to the on (ON) or start (ST) position and the engine speed is equal to or higher than a predetermined value Nth2 on the assumption of the recharging permission mode. Furthermore, the predetermined value Nth2 is set to a value larger than the predetermined value Nth1, and the two set values are values smaller than the engine speed Ni in which the idling state is maintained. When the charging start condition is satisfied (Yes in step S107) in the recharging permission mode, the recharging to the capacitor 25 is started (step S108). That is, the capacitor charge/discharge control unit C21 controls the driver 21 and performs a process in which the electric energy (the charge) generated by the generator motor 19 is stored (charged) to the capacitor 25 through the booster 26. Subsequently, the routine proceeds to step S101 so as to repeat the above-described process. Furthermore, when a negative determination is made in step S101, step S103, step S105, and step S107, the determination process in each of step S101, S103, S105, and S107 is repeated.

Here, the specific capacitor charge/discharge control process according to the first embodiment will be described by referring to the time chart illustrated in FIG. 4. In time chart illustrated in FIG. 4(a), the horizontal axis indicates the time, and the vertical axis indicates a change in the capacitor voltage (V). In the time chart illustrated in FIG. 4(b), the horizontal axis indicates the time, and the vertical axis indicates a change in the engine speed (N). In the time chart illustrated in FIG. 4(c), the horizontal axis indicates the time, and the vertical axis indicates a change in the position in which the key switch 31 is operated. In the time chart illustrated in FIG. 4(d), the horizontal axis indicates the time, and a change in the mode of the capacitor charge/discharge control device C21 is illustrated.

Figure 4:
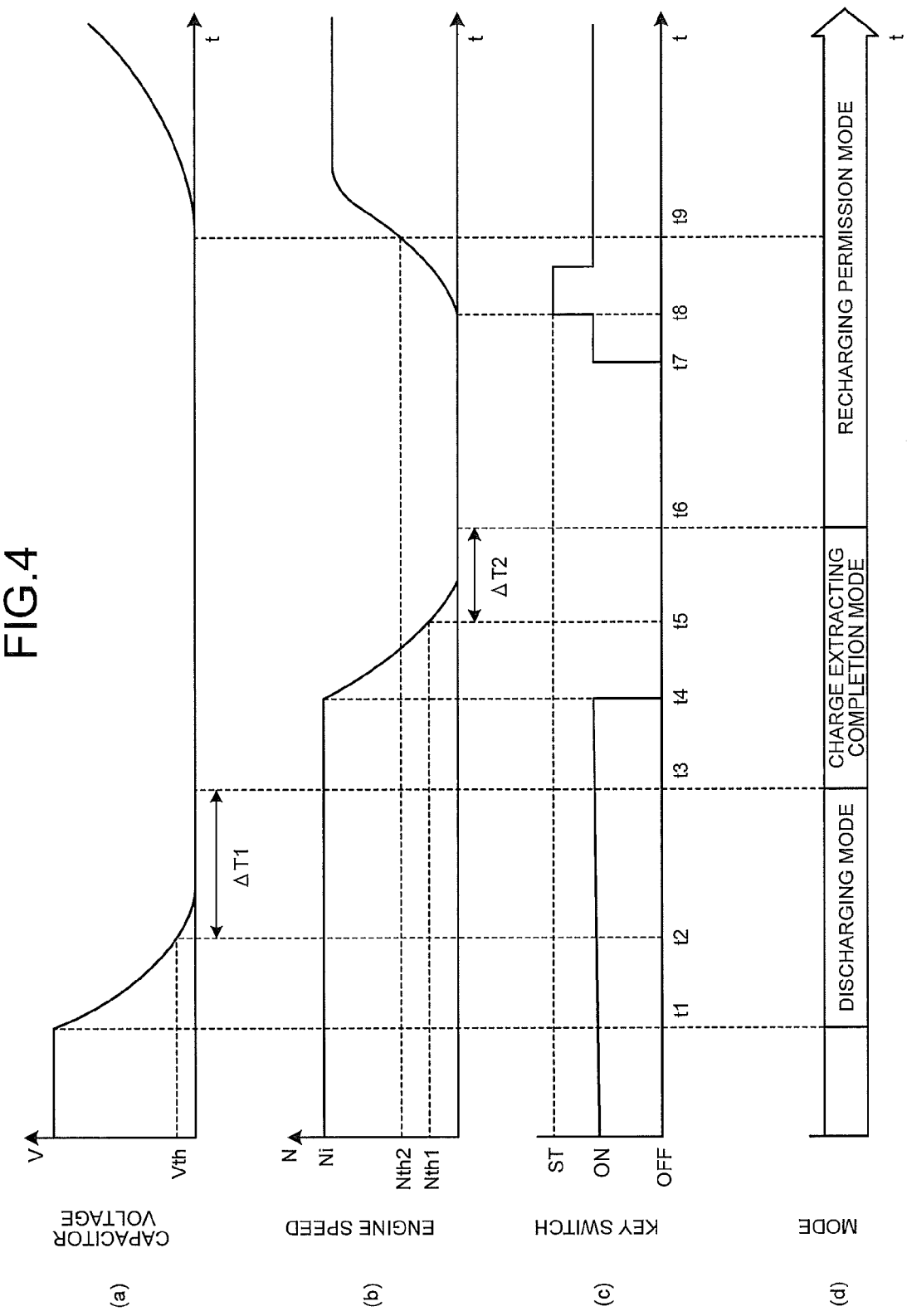
FIG. 4 is a time chart illustrating an example of the capacitor charge/discharge control process which is performed by the capacitor charge/discharge control unit according to the first embodiment of the invention.

As illustrated in FIG. 4, when there is an instruction of extracting the charge of the capacitor 25 at the time point t1, the capacitor charge/discharge control device C21 becomes a discharging mode, controls the engine speed N by the controller C1 and the hybrid controller C2 at a predetermined value Ni (for example, 800 rpm) in which the engine 17 is maintained in an idling state, and starts and performs the charge extracting by using the engine 17 as a load. Furthermore, the predetermined value Ni may be set to the other engine speed instead of the engine speed which is defined as the idling state. While the charge extracting is performed (in the discharging mode), the capacitor voltage gradually decreases and reaches the capacitor voltage (a predetermined value Vth (which is a predetermined voltage, for example, 10 V)) in which the charging of the capacitor 25 is substantially completed. The capacitor charge/discharge control unit C21 determines that the charge extracting is completed at the time point t3 in which the state of the predetermined value Vth or less is maintained for a predetermined time ΔT1 (for example, 10 minutes) from the time point t2 in which the capacitor voltage becomes the predetermined value Vth, and changes the mode from the discharging mode to the charge extracting completion mode. When the charge extracting completion mode is selected, the controller C1 receives a signal for representing the selection of the charge extracting completion mode from the hybrid controller C2. Then, the controller C1 outputs a control signal to the monitor device 30 so as to display the "guide for notifying the completion of the charge extracting and the switching of the key switch to the off state and the capacitor charging rate on the monitor screen W1" (hereinafter, such a display is referred to as the display of the guide for the charge extracting completion) as illustrated in FIG. 5.

The operator operates the key switch 31 to the off position at the time point t4 in accordance with the display of the guide for the charge extracting completion, so that the engine speed gradually decreases from the idling state (the engine speed Ni). Since the fuel supply instruction signal which is output from the controller C1 to the fuel injection device 40 is interrupted in the engine driving state with the operation of the key switch 31 to the off position, the engine speed decreases. However, the engine speed does not become zero until the inertial force disappears. The time is elapsed to the time point t5, and the time reaches a bifurcation used to determine whether the engine 17 is independently rotated as described above. Then, the engine speed decreases to the predetermined value Nth1 (for example, 300 rpm). When the engine speed N is equal to or lower than the predetermined value Nth1 for a predetermined time ΔT2 (for example, 1 second) from the time point t5, it is considered that the engine 17 is completely stopped (the engine stop state). Even when the key switch 31 is operated to the on position in the engine stop state, the engine speed does not reach the predetermined value Nth2 or more, and the recharging to the capacitor 25 is not performed. Subsequently, the capacitor charge/discharge control unit C21 is changed from the charge extracting completion mode to the recharging permission mode at the time point t6 in which the time is elapsed by the predetermined time ΔT2. That is, the recharging permission mode is a mode in which the recharging to the capacitor 25 is permitted and the recharging prohibition signal which has been output is canceled.

When the key switch 31 is operated from the off position to the on position at the time point (for example, the time point t7) in which the recharging permission mode is effective and the key switch is further rotated to the start position, the starter is actuated at the time point t8 and the engine 17 is started. After the key switch 31 is operated to the start (ST) position as described above, the key switch is maintained at the on (ON) position and the driving of the engine 17 is continued so that the engine speed N increases. When the engine speed N reaches the predetermined value Nth2 (for example, 500 rpm) at the time point t9 after the engine 17 is started, the capacitor charge/discharge control unit C21 determines that the charging start condition is established and controls the driver 21, the booster 26, and the inverter 22 so as to recharge the electric energy generated by the generator motor 19 to the capacitor 25. As a result, the capacitor voltage V gradually increases. In this way, the action in which the key switch 31 is operated to the on position and is further operated to the start position so as to start the starter is the operator's intention to perform the recharging, and the control of charge/discharge the capacitor 25 is performed so that the operator's intention matches the control content.

In the first embodiment, the control (in which the recharging prohibition signal is generated and the output of the recharging prohibition signal is maintained) of not permitting the recharging to the capacitor 25 is performed as the charge extracting completion mode until the engine speed is maintained for the predetermined time ΔT2 at the engine speed (the predetermined value Nth1) or less as a bifurcation used to determine whether the engine 17 is rotationally driven independently due to the original characteristics of the engine 17 and the like from the charge extracting completion (the time point t3 illustrated in FIG. 4 and the charging completion) of the capacitor 25, and the control of permitting the recharging to the capacitor 25 is performed by selecting the recharging permission mode as the condition in which the engine speed is maintained at the predetermined value Nth1 or less for the predetermined time ΔT2 after the charge extracting completion of the capacitor 25. According to the battery charge/discharge control device, the battery charge/discharge control method, and the hybrid working machine with the battery charge/discharge control device, it is possible to reliably prevent the charging of the capacitor 25 from being unexpectedly performed by the operator after the charge extracting completion of the capacitor 25.

Second Embodiment

Next, a second embodiment of the invention will be described. In the battery charge/discharge control device, the battery charge/discharge control method, and the hybrid working machine with the battery charge/discharge control device of the first embodiment, the control of prohibiting the recharging to the capacitor 25 is performed as the charge extracting completion (discharging completion) mode until the engine speed is maintained for the predetermined time ΔT2 at the predetermined engine speed (the predetermined value Nth1) or less as a bifurcation used to determine whether the engine 17 is independently driven due to the original characteristics of the engine 17 and the like, and the recharging permission mode is selected so as to permit the recharging. In the second embodiment, the time point in which the charge extracting completion mode is switched to the recharging permission mode by the capacitor recharging control unit C21 is set as the time point in which the cancelation signal of instructing the cancelation of the charge extracting completion mode is received.

Figure 6:
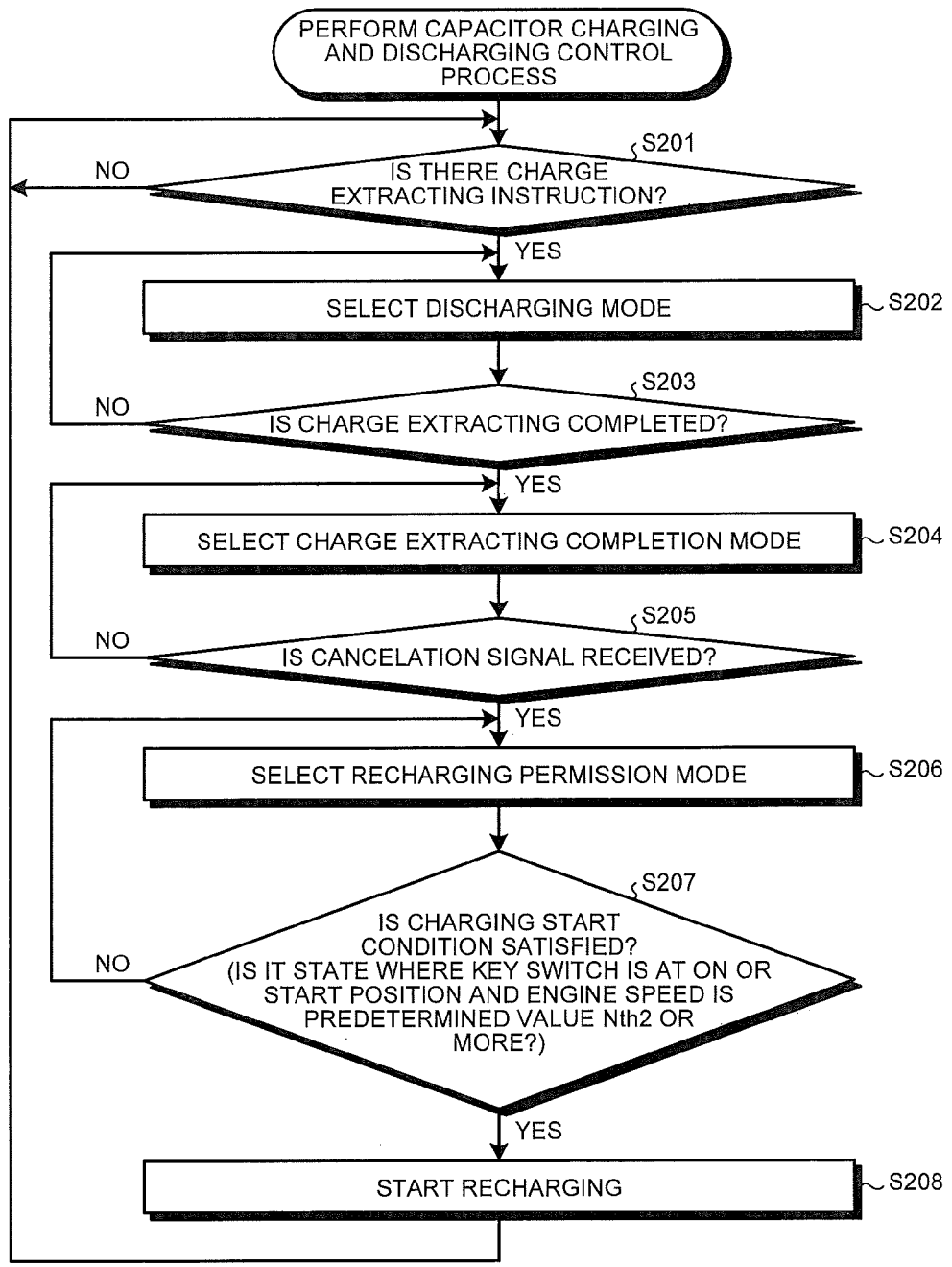
FIG. 6 is a flowchart illustrating a sequence of a capacitor charge/discharge control process which is performed by a capacitor charge/discharge control unit according to a second embodiment of the invention.

FIG. 6 is a flowchart illustrating the sequence of the capacitor charge/discharge control process which is performed by the capacitor charge/discharge control unit C21 according to the second embodiment of the invention. As illustrated in FIG. 6, in step S201 to S204, the charge extracting completion mode is first selected after the charge extracting completion as in step S101 to S104. Furthermore, in the charge extracting completion mode, the key switch 31 may not be essentially operated to the off position, and the engine speed may be in the idling state. Further, at the time point in which the charge extracting completion mode is selected, the monitor screen W2 illustrated in FIG. 8 is displayed on the screen of the monitor device 30 so as to notify the charge extracting completion mode through letters, and a cancelation button SW is displayed as an icon so as to cancel the charge extracting completion mode and select the recharging permission mode.

Figure 8:
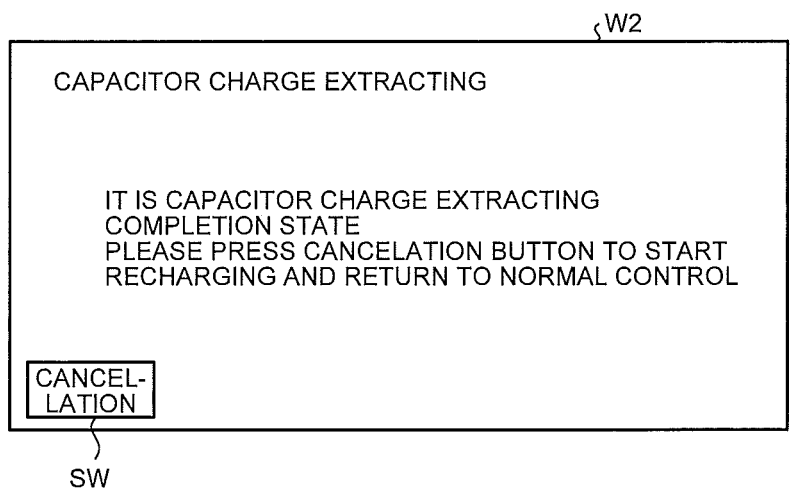
FIG. 8 is a diagram illustrating an example of a screen display of a monitor device according to the second embodiment of the invention.

Subsequently, the capacitor charge/discharge control unit C21 determines whether the cancelation signal which is generated with the pressing of the operation button (the icon indicating the cancelation button SW in the case where the monitor device 30 is the touch panel) corresponding to the cancelation button SW displayed inside the monitor screen W2 illustrated in FIG. 8 is received (step S205). When the capacitor charge/discharge control unit C21 receives the cancelation signal (Yes in step S205), the mode is changed to the recharging permission mode (step S206). The recharging permission mode is a mode in which the recharging to the capacitor 25 is permitted.

Subsequently, it is determined whether the charging start condition is satisfied (step S207). The charging start condition is a condition in which the key switch 31 is at the on or start position and the engine speed is equal to or higher than the predetermined value Nth2 on the assumption that the mode is the recharging permission mode. When the charging start condition is satisfied (Yes in step S207) in the recharging permission mode, the recharging to the capacitor 25 by the generation of the generator motor 19 is started (step S208). That is, the capacitor charge/discharge control unit C21 controls the driver 21 or the inverter 22 and performs a process in which the electric energy (the charge) generated by the generator motor 19 is accumulated (charged) to the capacitor 25 through the booster 26. Subsequently, the routine proceeds to step S201 so as to repeat the above-described process depending on the necessity later. Furthermore, when a negative determination is made in step S201, step S203, step S205, and step S207, the determination process in each of step S201, S203, S205, and S207 is repeated.

Here, the specific capacitor charge/discharge control process according to the second embodiment will be described by referring to the time chart illustrated in FIG. 7. In the time chart illustrated in FIG. 7(a), the horizontal axis indicates the time, and the vertical axis indicates a change in the capacitor voltage (V). In the time chart illustrated in FIG. 7(b), the horizontal axis indicates the time, and the vertical axis indicates a change in the engine speed (N). In the time chart illustrated in FIG. 7(c), the horizontal axis indicates the time, and the vertical axis indicates a change in the position in which the key switch 31 is operated. In the time chart illustrated in FIG. 7(d), the horizontal axis indicates the time, and the vertical axis indicates a change in the output (on or off) of the cancelation signal. In the time chart illustrated in FIG. 7(e), the horizontal axis indicates the time, and a change in the mode of the capacitor charge/discharge control unit C21 is illustrated.

Figure 7:
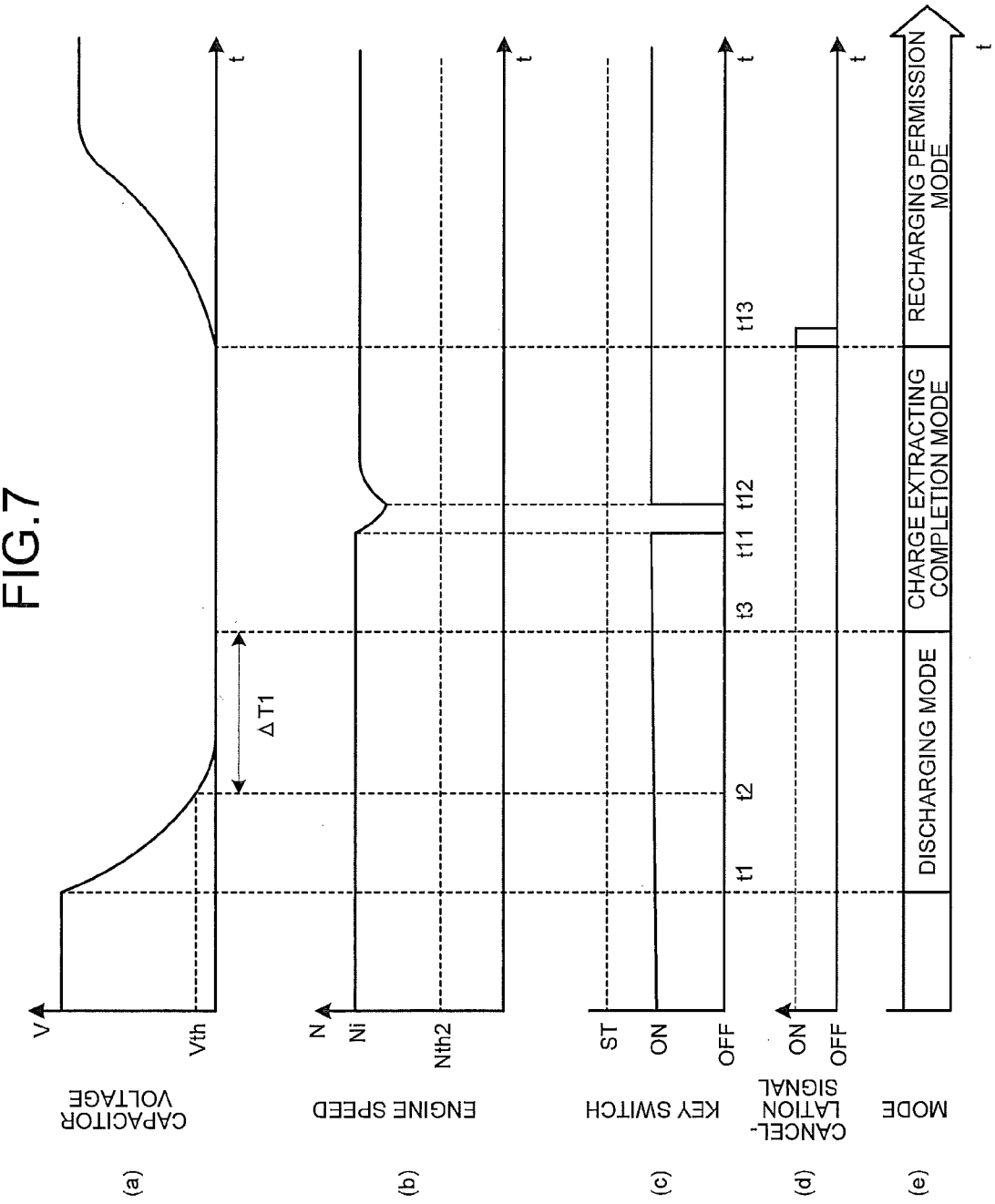
FIG. 7 is a time chart illustrating an example of the capacitor charge/discharge control process which is performed by the capacitor charge/discharge control unit according to the second embodiment of the invention.

As illustrated in FIG. 7, when there is an instruction of extracting the charge of the capacitor 25 at the time point t1, the capacitor charge/discharge control unit C21 selects the discharging mode. Then, the engine speed N of the engine 17 is controlled at the predetermined value Ni (for example, 800 rpm) corresponding to the idling state by the controller C1, and the charge extracting is performed by using the engine 17 as a load. Subsequently, the capacitor charge/discharge control unit C21 determines that the charge extracting is completed at the time point' t3 in which the state of the predetermined value Vth or less is maintained for the predetermined time ΔT1 (for example, 10 minutes) from the time point t2 in which the capacitor voltage V gradually decreases and becomes the capacitor voltage (the predetermined value Vth (for example, 10 V) as the predetermined voltage) corresponding to the level where the discharging of the capacitor voltage is substantially completed. Then, the capacitor charge/discharge control unit C21 changes the mode from the discharging mode to the charge extracting completion mode. When the charge extracting completion mode is selected, the monitor screen W2 displays the completion of the charge extracting and the icon indicating the cancelation button SW (see FIG. 8). In a case where the monitor device 30 is the touch panel, the charge extracting completion mode is maintained and the recharging is prohibited as long as the icon (the operation unit) indicating the cancelation button SW is not pressed. In a case where there is the operation button (the operation unit) provided in the monitor device 30 or the operation button (the operation unit) disposed near the monitor device 30 and the operation button corresponding to the cancelation button SW is provided, the charge extracting completion mode is maintained and the recharging is prohibited as long as the operation button corresponding to the cancelation button SW is not pressed.

When the operator presses the cancelation button SW, a pressing signal is generated (a cancelation signal becomes an ON state), the pressing signal is transmitted to the capacitor charge/discharge control unit C21 through the controller C1. As a result, the capacitor charge/discharge control unit C21 changes the mode from the charge extracting completion mode to the recharging permission mode at the time point t13 in which the cancelation button is pressed. That is, the mode is changed to the mode in which the recharging to the capacitor 25 is permitted. As illustrated in FIG. 7, the key switch 31 is operated to the off position at the time point t11, and the engine speed slightly decreases from Ni. Then, the key switch 31 is operated to the on position, and the engine 17 receives the fuel from the fuel injection device 40. When the engine speed N increases and the engine speed N becomes equal to or higher than Nth2 (the engine is independently driven), this state is considered as the current state. In such a state, since the engine speed is equal to or higher than the predetermined value Nth2 and the key switch 31 is present at the on position at the time point t13 in which the capacitor charge/discharge control unit C21 receives the cancelation signal and changes the mode to the recharging permission mode with the elapsing of the time, the charging start condition is satisfied (a positive determination in step S207 of FIG. 6), the recharging is immediately started, and the capacitor voltage V gradually increases. The operator's operation in which the cancelation button SW is pressed is the operator's intention in which the recharging is performed, and the control of charge/discharge the capacitor 25 is performed so that the operator's intention matches the control content.

As illustrated in FIG. 7, even when the key switch 31 is operated to the off position at the time point t11 in which the mode is the charge extracting completion mode and the key switch 31 is operated to the on position at the time point t12, the recharging to the capacitor 25 is not performed since the mode is not the recharging permission mode. The same applies to the temporary blackout which is generated regardless of the operation of the key switch 31 and is similar to the short interval between the time points t11 and t12, that is, the key switch 31 is electrically changed from the on state to the off state and is returned to the on state.

In the second embodiment, the control of prohibiting the recharging to the capacitor 25 is performed until the capacitor charge/discharge control unit C21 receives the cancelation signal of cancelling the prohibition of the recharging to the capacitor 25 with the pressing of the cancelation button SW from the charge extracting completion (the discharging completion) of the capacitor 25, and the control of permitting the recharging to the capacitor 25 by the generator motor 19 is performed by selecting the recharging permission mode as the condition in which the capacitor charge/discharge control unit C21 receives the cancelation signal of canceling the prohibition of the recharging to the capacitor 25 after the charge extracting completion of the capacitor 25. Accordingly, it is possible to reliably prevent the capacitor 25 from being unexpectedly charged by the operator after the charge extracting of the capacitor 25.

Furthermore, in the above-described second embodiment, a case has been described in which the operation unit such as the icon or the operation button of the cancelation button SW is provided on the monitor screen as the unit that generates the cancelation signal, but the invention is not limited thereto. That is, the other operation unit may be also employed. For example, as the generation of the cancelation signal, an operation lever signal which is generated by the operation of the specific operation lever 32, an on signal of an engine stop switch which is provided at the lower portion of the driver seat separately from the key switch 31 so as to stop the engine 17, or a wireless signal which is input from the outside of the hybrid excavator 1 through a receiving device provided in the hybrid excavator 1 may be employed.

Furthermore, in the above-described first or second embodiment, an example has been described in which the battery charge/discharge control device or the battery charge/discharge control method is applied to the hybrid excavator, but the device and the method may be also applied to the other construction machine. For example, bulldozer, a wheel loader, or the like provided in a running mechanism may employ the system in which the generator motor is driven by the engine, the electric energy generated by the generator motor is stored in the battery such as a capacitor or a lithium ion battery, and the motor is rotationally driven by receiving the electric energy from the battery. Even in the construction machine, there is a need to reliably perform the charge extracting (the discharging) of the battery when inspecting, repairing, and replacing the battery and to reliably prevent the unexpected charging by the operator.

REFERENCE SIGNS LIST 1 hybrid excavator
2 vehicle body
3 working machine
4 lower running body
5 upper swing body
11 boom
12 arm
13 bucket
14 boom hydraulic cylinder
15 arm hydraulic cylinder
16 bucket hydraulic cylinder
17 engine
18 hydraulic pump
18a swash plate
19 generator motor
20 driving shaft
21 driver
22 inverter
23 swing motor
24 swing machinery
25 capacitor
26 booster
27 contactor
28 voltage sensor
30 monitor device
31 key switch
32 operation lever
34 right running hydraulic motor
35 left running hydraulic motor
40 fuel injection device
41 rotation sensor
C1 controller
C2 hybrid controller
C21 capacitor charge/discharge control unit

The invention claimed is:

1. A battery charge/discharge control device which performs battery charge/discharge control in a working machine with a battery capable of storing electric energy generated by a generator motor coupled to an engine and driving the generator motor or at least one of other electric actuators by the stored electric energy and a controller which controls a distribution of the electric energy among the battery, the generator motor, and the electric actuator,
    wherein the controller performs the charge/discharge control in which the electric energy of the battery is discharged when the engine is driven and recharging to the battery is permitted on a condition that a cancelation signal for canceling prohibition of recharging to the battery is received after the battery is completely discharged.

2. The battery charge/discharge control device according to claim 1,
    wherein the controller performs the control in which the recharging to the battery is prohibited until the cancelation signal for cancelling the prohibition of the recharging to the battery is received after the battery is completely discharged.

3. The battery charge/discharge control device according to claim 1,
    wherein the cancelation signal is a signal which is generated by an operation of an operation unit.

4. A battery charge/discharge control method which performs battery charge/discharge control in a working machine with a battery capable of storing electric energy generated by a generator motor coupled to an engine and driving the generator motor or at least one of other electric actuators by the stored electric energy and a controller which controls a distribution of the electric energy among the battery, the generator motor, and the electric actuator, the method comprising:
    performing, by the controller, the charge/discharge control in which the electric energy of the battery is discharged when the engine is driven and recharging to the battery is permitted on a condition that a cancelation signal for canceling prohibition of recharging to the battery is received after the battery is completely discharged.

5. The battery charge/discharge control device according to claim 1,
    wherein the charge/discharge control is performed by determining the battery discharging completion as a time point in which a predetermined time is elapsed from a state where a voltage of the battery is equal to or lower than a predetermined value.

6. A hybrid working machine comprising:
    the battery charge/discharge control device according to claim 1.

* * * * *